March 6, 1928.
G. A. JAMERSON
CHASSIS LUBRICATION CONTROL DEVICE
Filed Feb. 26, 1925
1,661,663
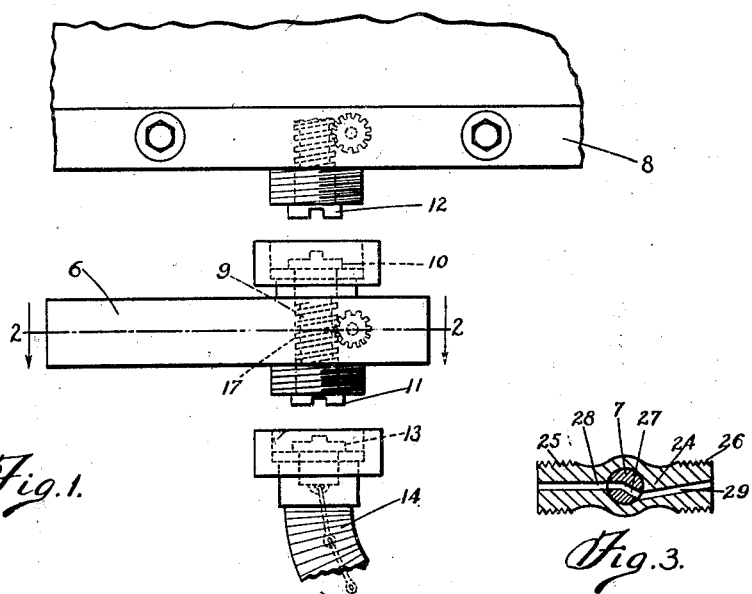
Fig. 1.
Fig. 3.
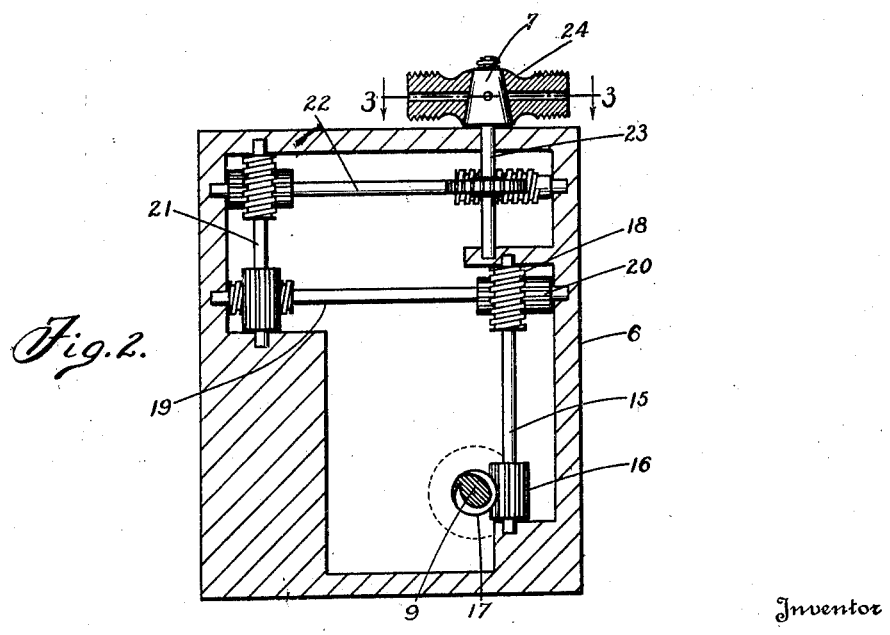
Fig. 2.
Inventor
Gus A. Jamerson
By Murray & Zugelter
Attorneys.

Patented Mar. 6, 1928.

1,661,663

UNITED STATES PATENT OFFICE.

GUS A. JAMERSON, OF CINCINNATI, OHIO.

CHASSIS-LUBRICATION-CONTROL DEVICE.

Application filed February 26, 1925. Serial No. 11,857.

This invention relates to automatic force feed chassis lubricating systems for automobiles.

An object of my invention is to provide a device of the kind referred to which will permit a lubricant under pressure to flow from a suitable source to the bearings of an automobile chassis during a certain period of travel of the automobile and to then shut off the flow of lubricant during another period of travel of the vehicle.

It is also an object of the invention to effect economies in the manufacture and installation of systems of this character. The invention deals especially with the mechanism for controlling the flow of lubricant through a force feed chassis lubricating system, and it provides a mechanism which can be installed on motor vehicles very quickly and conveniently.

These and other objects are attained by the means described herein and disclosed in the accompanying drawings, in which:

Fig. 1 is an end view of an automatic controlling or regulating mechanism embodying my invention, and shows the means for connecting it between the transmission and the usual flexible shaft for driving the speedometer.

Fig. 2 is a cross sectional view on line 2—2 of Fig. 1.

Fig. 3 is a cross sectional view on line 3—3 of Fig. 2, and disclosing a detail of the valve mechanism of the device of my invention.

The device of my invention may be conveniently interposed between the ordinary automobile transmission and the usual flexible drive which connects the transmission with a speedometer. While described herein and disclosed in the drawings as being adapted to such connection, it will be readily apparent to those skilled in the art that it may also be actuated independently of the speedometer drive by any suitable means such as positioning and connecting the device adjacent to the main drive shaft or one of the wheels of an automobile. The device shown comprises a casing or frame structure 6 interiorly of which are journaled a plurality of shafts carrying intermeshing worms and worm gears by means of which the valve 7 is rotated. The device is preferably actuated from the wheels of the automobile through a suitable drive so that the valve may be opened and lubrication supplied to the chassis bearings once during a determinable number of miles rather than after a determinable number of revolutions of the motor. As shown in Fig. 1 the casing 6 is adapted to be mounted beside the transmission 8 of the machine and the drive shaft 9 is provided at its opposite ends with suitable drive couplings 10 and 11 for connection with the exposed end of the shaft 12 in the transmission and the drive coupling 13 of the flexible drive 14 respectively. In this way it is necessary only to disconnect the flexible shaft 14 from the transmission 8 and to connect the drive members 10 and 12 on the shaft 9 and the transmission 8 respectively and to then connect the drive coupling 13 of the flexible drive 14 to the member 11 of the regulating device. The drive shaft 9 will then serve as a connecting member between the flexible drive 14 and the transmission 8 as well as serving its function in driving the mechanism for rotating the valve 7. As shown in Fig. 2 a shaft 15 extends transversely of the drive shaft 9 and is provided with a spiral gear or worm gear 16 intermeshing with the worm 17 on the drive shaft 9. The shaft 15 carries at its opposite end a worm 18 which in turn drives shaft 19 through a worm gear 20. Additional shafts 21 and 22 are included in the chain of driving connections to the valve 7. The shafts 15, 19, 21 and 22 are substantially alike, each having a worm gear at one end and a worm at the other so that the valve shaft 23 may be caused to make one complete revolution during a given distance of travel of the wheels of the automobile, for example fifty miles. Obviously the ratio of the worms and worm wheels may be altered to accomplish more rapid or slower rotation of the valve 7. The valve 7 is mounted in a suitable valve casing or body 24 which is provided at its opposite ends with suitable means such as threads 25 and 26 for coupling the supply conduit from a motor force feed lubrication pump (not shown) to one end, and a supply line to any suitable chassis lubricating system to its other end. The valve 7 which may take the form of a conical plug has a curved or offset hole 27 extending transversely therethrough. The opposite ends of the hole 27 in the valve 7 are adapted to register with the holes 28 and 29 in the casing 24 once only during each revolution of the valve 7, the bores 28 and 29 bearing a suitable offset relation one to the other in order to accomplish this, see Fig. 3. The valve 7 rotating once during, say, every 50 miles of travel of the automobile will bring the opening 27 into registry with the bores 28 and 29 once in that time and will permit a flow of lubricant under pressure from the bore 28 through opening 27 and out of the bore 29 to the chassis over a fractional portion of the given fifty miles. This may also be regulated within certain limits. Normally in a valve structure such as is shown in Fig. 3 the lubricant under pressure would find its way through the opening 27 during about one-tenth of a revolution so that if the valve were arranged to make one complete revolution during every fifty miles of travel, then for a distance of five miles lubricant under pressure would be transmitted to the chassis bearings and the valve would again shut off the flow for the next forty-five miles.

The operation of the device is as follows:

Assuming that an automobile is equipped with suitable force feed chassis lubricators and also with a speedometer, a control device of my invention may be readily installed upon the automobile with a minimum of effort and labor. The speedometer chain or flexible shaft 14 is disconnected from the drive shaft 12 in the transmission and the casing 6 is mounted immediately beside the transmission casing. One end 10 of the drive shaft 9 is then coupled to the shaft 12 while its other end is coupled to the member 13 of the flexible speedometer shaft. A tube or pipe leading from the pressure side of the oil pump of the engine then is connected to one of the threaded ends 25 or 26 of the valve casing or body 24 and the other end is connected to the oil supply line leading to the lubricating devices at the individual bearing surfaces. This completes the installation of this part of the system.

The drive to the speedometer is not interfered with in any way since the shaft 9 of the control device provided by this invention is simply included in this drive, forming another element in the driving connections between the transmission and the speedometer. The connections between the speedometer chain or flexible shaft 14 and the transmission or wheels of the machine is well understood by those skilled in this art, and therefore need not be described or illustrated here.

It will now be understood that the invention provides a control apparatus for force feed chassis lubricating systems which is simple in construction, can be installed with a minimum of labor, and which is entirely automatic in its operation.

While I have herein shown and described a preferred embodiment of my invention, it will be evident that the invention may be embodied in other forms without departing from the spirit or scope thereof.

What I claim is:

1. In a motor vehicle having a chassis lubricating system, and an accessory with actuating mechanism therefor; the combination of a control device for said lubricating system, and means to connect said device to a moving part of the vehicle to be driven thereby and to the actuating mechanism of the accessory, thereby to actuate said accessory.

2. A controlling mechanism for force feed chassis lubricating systems for motor vehicles comprising a casing, a valve body, a valve in said body, means for actuating said valve, comprising a driving shaft projecting transversely through said casing from one side thereof to the other, and couplings for connecting the opposite ends of said shaft to elements in the mechanism for driving an accessory of the vehicle.

3. A controlling mechanism for force feed chassis lubricating systems for motor vehicles, comprising a casing, a valve body, a rotary valve mounted in said body, a train of worms and worm gears in said casing for rotating said valve, a driving shaft projecting transversely through said casing from one side thereof to the other, and couplings for connecting the opposite ends of said shaft to elements in the mechanism for driving the speedometer of the vehicle.

4. In a motor vehicle having a force feed chassis lubricating system, a driven accessory, and a permanent driving connection for said accessory; the combination of a control device for said system, comprising means to control the flow of lubricant, operating mechanism for said device, and a driving element for said mechanism adapted to connect the permanent driving connection to the driven mechanism of the accessory.

5. In a motor vehicle having a force feed chassis lubricating system, a driven accessory, and a permanent driving connection for said accessory; a controlling mechanism for said system, comprising a device for controlling the flow of lubricant, and operating mechanism for said device including reduction gearing, a shaft for driving said gearing, and means to connect the permanent driving connection to the driven mechanism of the accessory through said shaft.

6. In a motor vehicle having a force feed chassis lubricating system, a speedometer having a flexible shaft for driving it, and means for driving said shaft; a controlling apparatus for said system comprising a device for controlling the flow of lubricant and operating mechanism for said device comprising a casing, a driving shaft in said casing, reduction gearing in said casing operatively connected with said shaft, and means for connecting one end of said shaft to the flexible speedometer shaft and the other end to the driving means for said flexible shaft, whereby both said operating mechanism and said speedometer may be driven by said driving shaft.

7. In a motor vehicle having a force feed chassis lubricating system, an accessory having a driving shaft and means for driving said shaft; a controlling mechanism for said system comprising, in combination, a rotary valve, a casing, a train of worms and worm gears mounted in said casing and arranged to rotate said valve, said valve being constructed to permit the flow of lubricant therethrough once only during each revolution of the valve, a driving shaft for said train, and means for connecting one end of the last mentioned shaft to the accessory driving shaft and the other end to the means for driving the accessory shaft.

8. In a motor vehicle having a chassis lubricating system and an accessory having mechanism driven from a permanent driving connection on the chassis; the combination of a valve casing having an inlet and an outlet, a rotary valve adapted to establish communication between said inlet and outlet, said valve casing being connected in said system whereby said valve is operative to control the flow of lubricant therein, and means interposed between said chassis driving connection and said driven mechanism for actuating said accessory and for operating said valve to open it once during a predetermined distance of travel of the motor vehicle, said means including a reduction gearing for operating the valve.

9. In a motor vehicle having a chassis lubricating system, and an accessory having mechanism driven from a rotary part on the chassis, which part has a fixed relation to the distance travelled by the motor vehicle, the combination of a rotary valve for controlling the flow of lubricant through said system, actuating means for rotating the valve comprising reduction gearing, means for driving the reduction gearing from said rotating part, and means for driving said mechanism from said valve actuating means.

In testimony whereof, I have hereunto subscribed my name this 24th day of February, 1925.

GUS A. JAMERSON.